United States Patent
Jun et al.

(10) Patent No.: US 7,543,208 B2
(45) Date of Patent: Jun. 2, 2009

(54) JTAG TO SYSTEM BUS INTERFACE FOR ACCESSING EMBEDDED ANALYSIS INSTRUMENTS

(75) Inventors: Hongshin Jun, San Jose, CA (US); Gyaneshwar S. Saharia, Cupertino, CA (US); William Eklow, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 362 days.

(21) Appl. No.: 11/493,784

(22) Filed: Jul. 26, 2006

(65) Prior Publication Data

US 2008/0052582 A1 Feb. 28, 2008

(51) Int. Cl.
*G01R 31/28* (2006.01)
(52) U.S. Cl. .................................. 714/727; 714/729
(58) Field of Classification Search ................. 702/123; 716/1, 17; 719/321; 714/31, 724, 726, 729, 714/727
See application file for complete search history.

(56) References Cited

U.S. PATENT DOCUMENTS

| | | | | |
|---|---|---|---|---|
| 4,707,834 A * | 11/1987 | Frisch et al. | ................... | 714/31 |
| 5,349,660 A * | 9/1994 | Sutula et al. | ................. | 702/123 |
| 5,737,497 A * | 4/1998 | Ballard | ........................ | 706/47 |
| 6,484,273 B1 | 11/2002 | Chang | | |
| 6,694,489 B1 * | 2/2004 | Case et al. | ..................... | 716/1 |
| 6,968,472 B2 * | 11/2005 | Fernald | ...................... | 713/400 |
| 6,983,441 B2 * | 1/2006 | Wescott | ........................ | 716/17 |
| 6,993,772 B2 * | 1/2006 | Pike et al. | ................... | 719/321 |
| 2006/0236174 A1 * | 10/2006 | Whetsel | ...................... | 714/724 |

\* cited by examiner

*Primary Examiner*—David Ton
(74) *Attorney, Agent, or Firm*—The Law Office of Kirk D. Williams

(57) ABSTRACT

Disclosed are, inter alia, methods, apparatus, data structures, computer-readable media, mechanisms, and means for providing a JTAG to system bus interface for accessing embedded analysis system(s). JTAG commands are received and converted into commands sent out a bus to a device including an embedded analysis instrument, with results received over the bus forwarded out the JTAG interface to an external device. Such a JTAG to system bus interface may eliminate the need to provide separate JTAG TAP interfaces on each ASIC of a board, and/or eliminate the need to daisy chain multiple TAP interfaces of multiple ASICs in order to provide a single TAP interface for accessing the multiple embedded testing instruments.

20 Claims, 9 Drawing Sheets

| JTAG TO CPUIF COMMAND | Size | Field | Direction | Note |
|---|---|---|---|---|
| ADDR | 32 | [31:0] | W | |
| DATA | 32 | [63:32] | R/W | |
| CMD | 1 | [64] | W | 0: Read, 1:Write |
| STATUS | 4 | [68:65] | R | Ready, ACK, Timeout, Parity-Error |
| EN | 1 | [69] | W | Enable, Default = 0 |

JTAG TO SYSTEM BUS INTERFACE FOR ACCESSING EMBEDDED ANALYSIS INSTRUMENTS

TECHNICAL FIELD

One embodiment of the invention relates to testing of boards and components of communications and computer systems, especially routers, packet switching systems, and other devices; and more particularly, one embodiment relates to a JTAG to system bus interface for accessing embedded analysis instruments.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

The use of test and debug instruments embedded in components and boards is becoming more prevalent as device speeds and complexities continue to increase. When implemented on components, they can provide an efficient way of testing and debugging memories, logic and interconnections on boards. If so designed, they can also provide capabilities for measuring jitters, eye diagram, or bit error rates on the high speed lines.

FIG. 1 illustrates a conventional prior art approach for interfacing with embedded testing and debugging instruments distributed across a line card or daughter board via a CPU bus interface and/or via a JTAG interface. Some boards may just provide access via one of these methods, as providing access via both way is an additional expense. However, typically, the different stages of design, testing, manufacturing, and operations do not use the same test equipment, so some require access to the embedded testing instruments via an external CPU, while some require access via a JTAG interface.

First, as shown, the embedded instruments can be accessed via its associated bus (CPUIF) by an external CPU or supervisor connected to the CPU bus controller. Through the CPUIF, a supervisor talks to line cards to bring them up and to run diagnostic routines.

Second, as shown, the embedded instruments can be accessed via a conventional IEEE 1149.1 (JTAG) interface. IEEE 1149.1 has been adopted industry wide for testing PCB interconnections on board. Beyond the main objective, it is used for interfacing the embedded test and debug instrument on boards or ASICs. The JTAG interface is the standard interface in board manufacturing flow from ICT (In-Circuit Test) to debug station. A JTAG interface is typically mandatory for using embedded instruments during manufacturing. Note, a variant of this approach is not to provide a centralized accessible JTAG TAP that daisy chains to all ASICs, but rather to use a separate physical connection to each JTAG TAP of each ASIC, which can be problematic if it is desired to control embedded testing instruments in multiple ASICs at the same time. This daisy-chain approach requires a lot of expense and could be a source of board connectivity routing errors and complications that must overcome. This approach adds design complexity as all the registers required to run embedded instruments must be identified, and test data registers must be allocated with access to these registers provided via the JTAG TAP. Also, generating the appropriate patterns to control the embedded instruments is quite complex, and these patterns depend on the implemented JTAG chain through the components, therefore, these patterns are different for each implementation.

Engineers have desired for a long time a better approach, but have in the past have had to settle for JTAG accessing the embedded testing equipment either through the daisy-chain approach or via direct JTAG connections to each ASIC.

SUMMARY

Disclosed are, inter alia, methods, apparatus, data structures, computer-readable media, mechanisms, and means for providing a JTAG to system bus interface for accessing embedded analysis system(s). One embodiment includes one or more parallel buses communicatively coupled to one or more devices including embedded analysis instruments. A JTAG interface is configured for shifting in (receiving) and out (sending) serial JTAG commands and data. A JTAG bus controller is configured to interface the parallel bus(es) and the JTAG interface, which typically includes converting between received serial commands and data into commands to be sent over the parallel bus(es) to the embedded analysis instrument(s). In one embodiment, the JTAG bus controller is configured to convert between results received from the embedded analysis instrument(s) over the parallel buses and results to be sent out the JTAG interface.

In one embodiment, the embedded analysis instruments include one or more embedded testing and/or debugging instruments, and/or built-in self-test (BIST) components. One embodiment includes a bus interface switch communicatively coupled to an external bus connector and a between the JTAG bus controller and said parallel buses, wherein the bus interface switch is configured communicate with said parallel buses and to selectively switch the between the external BUS connector and the JTAG bus controller.

In one embodiment, the JTAG bus controller includes test registers and a communications finite state machine, wherein the test registers are configured to exchange the serial commands and data with the JTAG interface and the communications finite state machine (or processor) is configured to perform said converting for sending and receiving information over said parallel buses. The test registers and the JTAG interface are clocked based on a test clock signal, and the communications finite state machine (or processor) is clocked based on a system clock signal, the system clock signal being at a different rate than the test clock signal.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
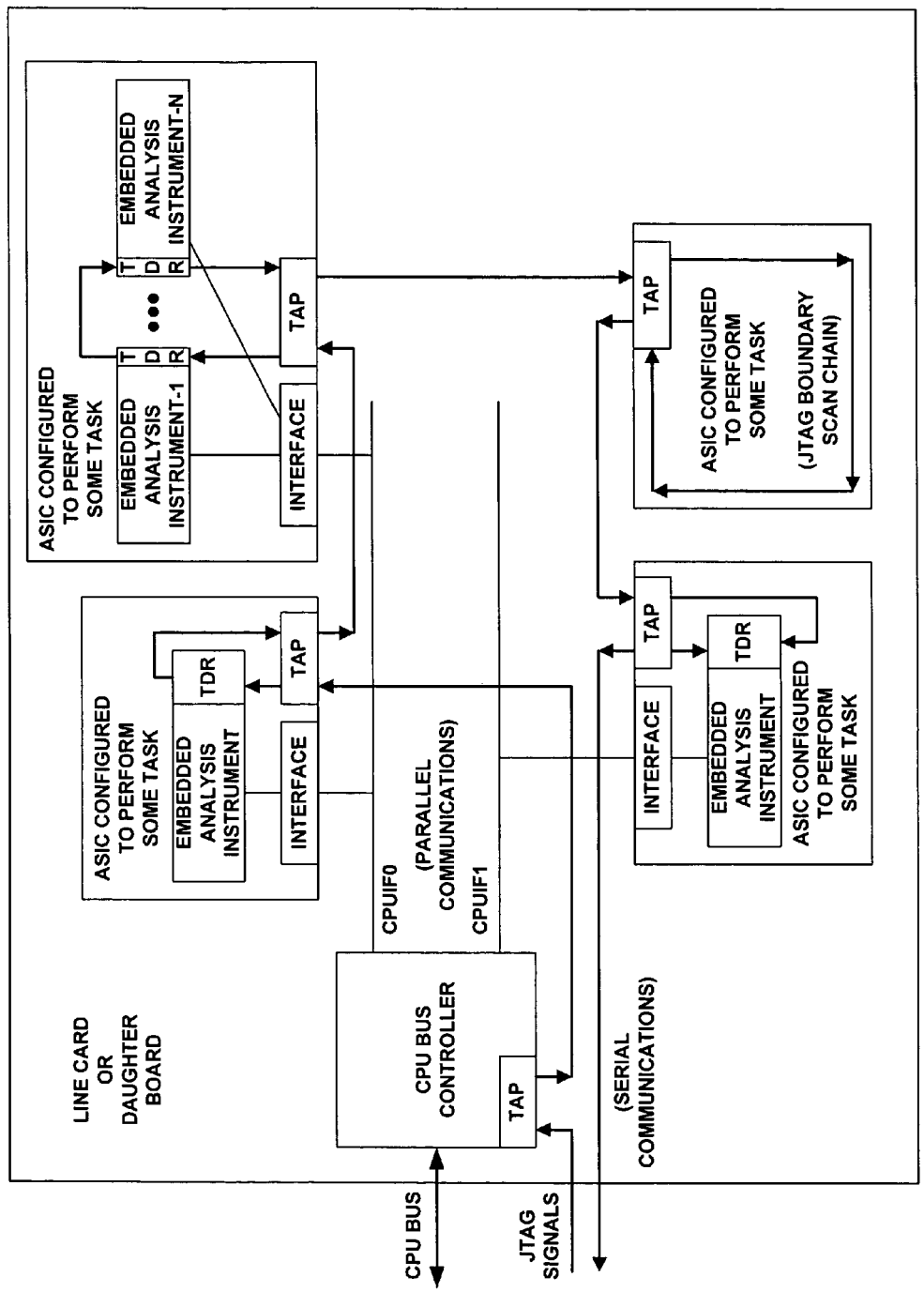
FIG. 1 is a block diagram illustrating a prior art system for communicating with embedded testing instruments.

Disclosed are, inter alia, methods, apparatus, data structures, computer-readable media, mechanisms, and means for providing a JTAG to system bus interface for accessing embedded analysis system(s). JTAG commands are received and converted into commands sent out a bus to a device including an embedded analysis instrument, with results received over the bus forwarded out the JTAG interface to an external device. Such a JTAG to system bus interface may eliminate the need to provide separate JTAG TAP interfaces on each ASIC of a board, and/or eliminate the need to daisy chain multiple TAP interfaces of multiple ASICs in order to provide a single TAP interface for accessing the multiple embedded testing instruments.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism tangibly embodying instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for providing a JTAG to system bus interface for accessing embedded analysis system(s). One embodiment includes one or more parallel buses communicatively coupled to one or more devices including embedded analysis instruments. A JTAG interface is configured for shifting in (receiving) and out (sending) serial JTAG commands and data. A JTAG bus controller is configured to interface the parallel bus(es) and the JTAG interface, which typically includes converting between received serial commands and data into commands to be sent over the parallel bus(es) to the embedded analysis instrument(s). In one embodiment, the JTAG bus controller is configured to convert between results received from the embedded analysis instrument(s) over the parallel buses and results to be sent out the JTAG interface.

In one embodiment, the embedded analysis instruments include one or more embedded testing and/or debugging instruments, and/or built-in self-test (BIST) components. One embodiment includes a bus interface switch communicatively coupled to an external bus connector and a between the JTAG bus controller and said parallel buses, wherein the bus interface switch is configured communicate with said parallel buses and to selectively switch the between the external BUS connector and the JTAG bus controller.

In one embodiment, the JTAG bus controller includes test registers and a communications finite state machine, wherein the test registers are configured to exchange the serial commands and data with the JTAG interface and the communications finite state machine (or processor) is configured to perform said converting for sending and receiving information over said parallel buses. The test registers and the JTAG interface are clocked based on a test clock signal, and the communications finite state machine (or processor) is clocked based on a system clock signal, the system clock signal being at a different rate than the test clock signal.

One embodiment receives a JTAG command over a JTAG serial interface, with the JTAG command defining to write to, or read from, a particular embedded analysis instrument. In response to the received JTAG command: the serially received JTAG command is converted into a corresponding formatted command compatible with a bus, and is caused to be transmitted a bus to a device including the particular embedded analysis instrument. An embedded analysis response is received from the device including the particular embedded analysis instrument, with the embedded analysis response including status or read data generated by the particular embedded analysis instrument in response to information included in the formatted command. In response to receiving the embedded analysis response, the embedded analysis response is converted into a properly formatted JTAG message, which is caused to be sent out of the JTAG serial interface.

One embodiment includes: means for receiving a JTAG command over a JTAG serial interface, the JTAG command defining to write to or read from a particular embedded analysis instrument; means for, in response to said received JTAG command: converting said serially received JTAG command into a corresponding formatted command compatible with said one or more parallel buses, and causing said formatted command to be transmitted over said one or more parallel buses to a device including the particular embedded analysis instrument; means for receiving an embedded analysis response from the device including the particular embedded analysis instrument, the embedded analysis response including status or read data generated by the particular embedded analysis instrument in response to information included in said formatted command; and means for, in response to receiving the embedded analysis response, converting the embedded analysis response into a properly formatted JTAG message and causing the properly formatted JTAG message to be sent out of the JTAG serial interface.

In one embodiment, said means for converting said received JTAG command includes test registers and a communications finite state machine (or processor), wherein the test registers are configured to exchange said serial commands and data with said means for converting said received JTAG command and the communications finite state machine (or processor) is configured to perform said converting for sending and receiving information over said parallel buses. In one embodiment, the test registers and said means for converting said received JTAG command are clocked based on a test clock signal, and the communications finite state machine (or processor) is clocked based on a system clock signal, the system clock signal being at a different rate than the test clock signal. One embodiment includes means for selectively switching communicative connectivity with said parallel buses between said means for converting said received JTAG command and an external BUS connector.

Figure 2:
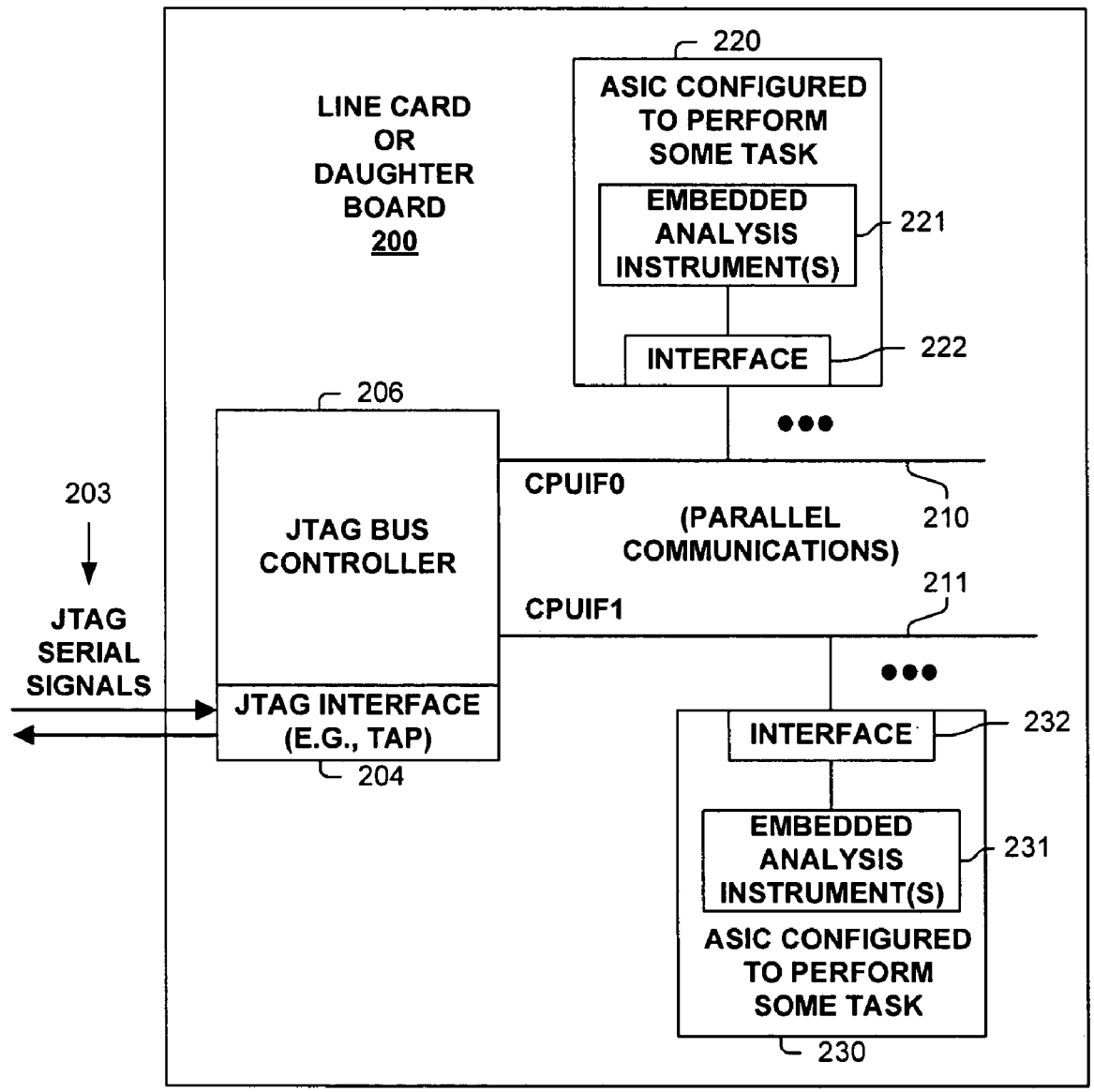
FIG. 2 is a block diagram of a line card illustrating a JTAG to system bus interface for accessing embedded analysis instruments in accordance with one embodiment.

FIG. 2 is a block diagram of a line card illustrating a JTAG to system bus interface for accessing embedded analysis instruments in accordance with one embodiment. Shown is line card or daughter board 200, which is used in one embodiment to interface between JTAG commands and embedded analysis instruments 221 and 231 over buses 210, 211. As illustrated, JTAG signals 203 are received and sent from JTAG interface 204, which is typically, but not limited to, a standardized JTAG TAP 204. JTAG bus controller 206 converts between the JTAG serially received and sent signals 203 and parallel communication messages sent over and received from buses 210 and 211 to communicate with devices 220 and 230. Devices 220 and 230 each have a bus interface (222, 232) to communicate over one of the system buses and which is communicatively coupled to its respective one or more embedded analysis instruments (221, 231). Of course, there can be more or less numbers of buses and/or devices with embedded analysis instruments, and/or actual embedded analysis instruments (e.g., testing instruments, debugging instruments, BIST, etc.).

Figure 3:
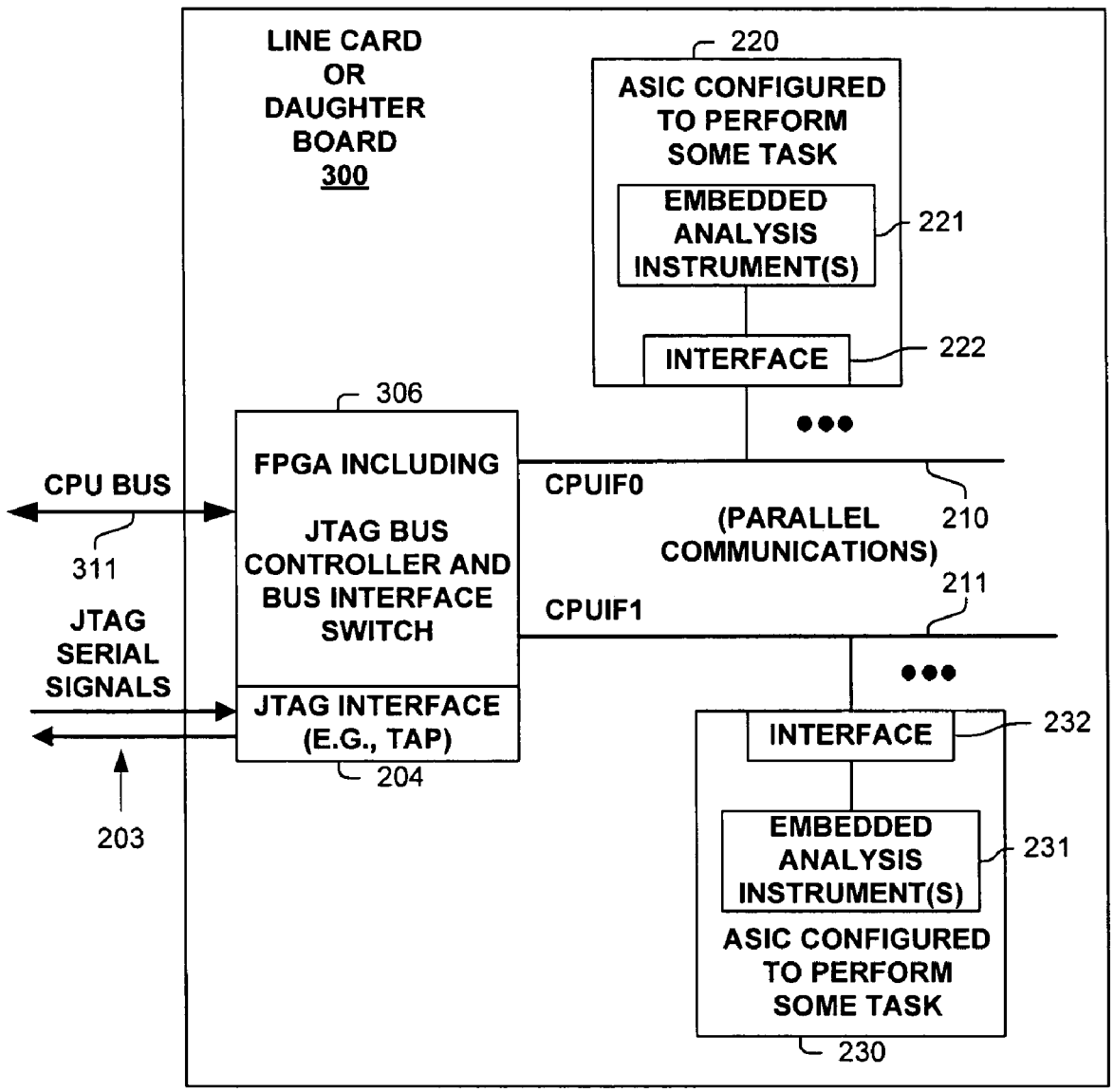
FIG. 3 is a block diagram of a line card illustrating a JTAG to system bus interface for accessing embedded analysis instruments in accordance with one embodiment.

FIG. 3 is a block diagram of a line card illustrating a JTAG to system bus interface for accessing embedded analysis instruments in accordance with one embodiment. Shown is line card or daughter board 300, which is used in one embodiment to interface between JTAG commands and embedded analysis instruments. FIG. 3 expands the operations shown in FIG. 2, and illustrates one embodiment which also provides a CPU bus interface 311 for communicating with an external processor (or other device) for accessing embedded analysis instrument(s) 221, 231. FPGA includes the JTAG controller for interfacing between the JTAG and bus signals for communicating with embedded analysis instrument(s) 221, 231, and provides a bus interface switch for switching the communication with buses 210, 211 to either CPU bus 311 or the JTAG bus controller included in FPGA 306.

Figure 4:
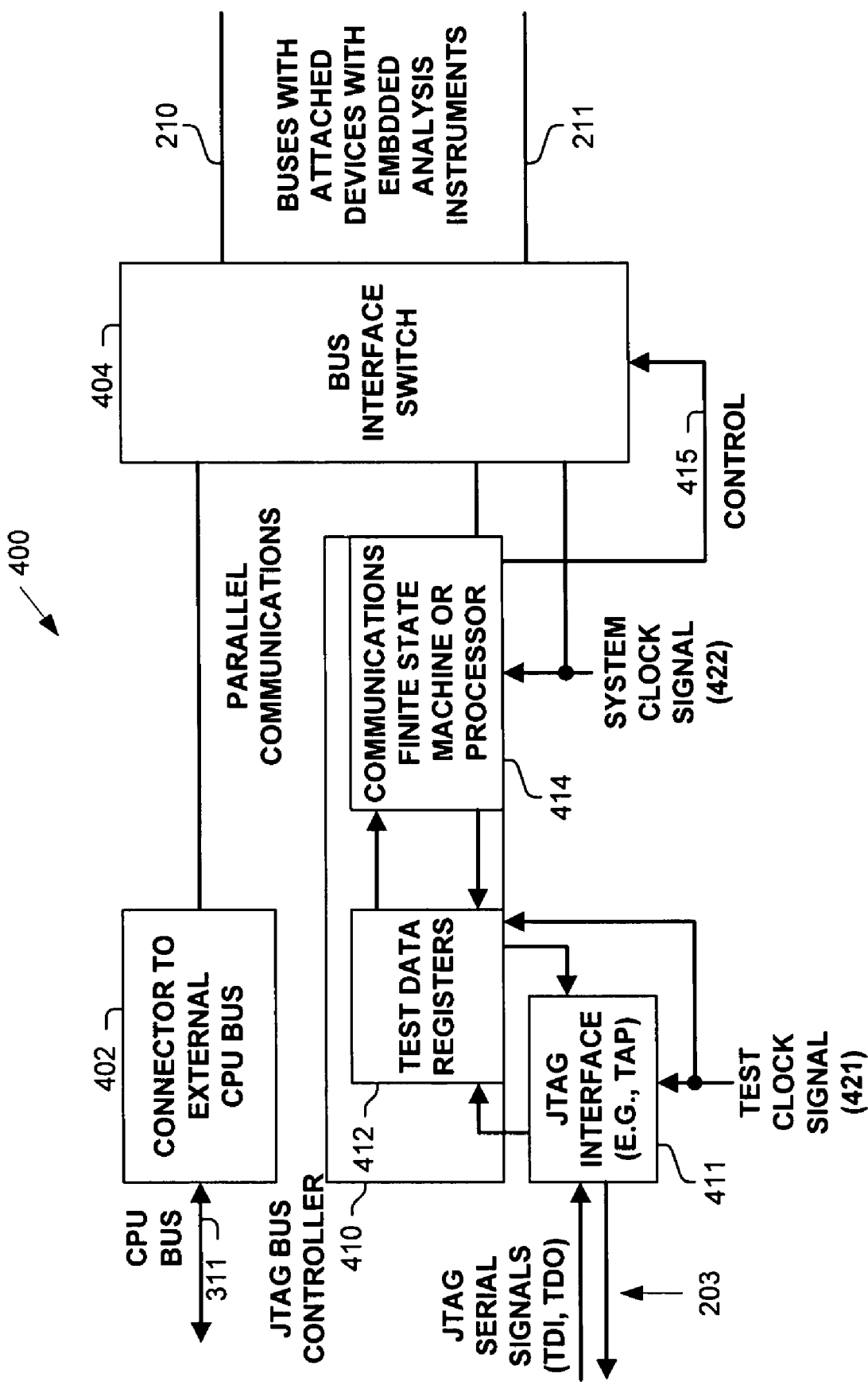
FIG. 4 is a block diagram of a line card illustrating a JTAG to system bus interface for accessing embedded analysis instruments in accordance with one embodiment.

FIG. 4 is a block diagram of an apparatus 400 illustrating a JTAG to system bus interface (i.e., JTAG bus controller 410) for accessing embedded analysis instruments attached to buses 210 and 211. Bus interface switch selectively switches the communication between connector 402 to the external CPU bus 311 and JTAG bus controller 410, so that the embedded analysis instruments can be accessed by an external device using CPU bus 311 or JTAG interface 411. In one embodiment, this selection is controlled via control signal 415 generated by JTAG bus controller 410, such as by in default mode, communicatively coupling with bus connector 402, and to JTAG bus controller 410 when it is interfacing with an embedded analysis system. In one embodiment, switching is automatic depending on the communications traffic source and destination.

In one embodiment, JTAG bus controller 410 includes test data registers 412, which are just to receive information from, and place information in, JTAG interface 411. Communication finite state machine or processor 414 retrieves commands and data from test registers 412, performs the indicated read, write, or other operation typically by accessing an embedded analysis instrument over a bus 210, 211 through bus interface 404, which typically includes converting a serially received JTAG command, converting it into a format compatible with bus 210, 211, causing the converted command to be communicated over bus 210, 211 to a selected embedded analysis instrument, receiving the response over bus 210, 211, converting the received response into a properly formatted JTAG message placed in test data registers 412, and causing the properly formatted JTAG to be placed in JTAG interface 411 for sending out as JTAG signals 203.

Note, in one embodiment, JTAG interface 411 and test data registers 412 are clocked via test clock signal 421, which is operating at a different rate than system clock signal 422 provided to communications finite machine or processor 414.

Figure 5A:
FIG. 5A is a block diagram illustrating command formats used in one embodiment.

FIG. 5A is a block diagram illustrating command formats 500 used in one embodiment. Shown are the type of data (501), size in bits (502), the location of these bits in a properly formatted JTAG command (503), the read/write direction of relevance (504), and some notes (505). Of course, embodiments can use other formats.

Figure 5B:
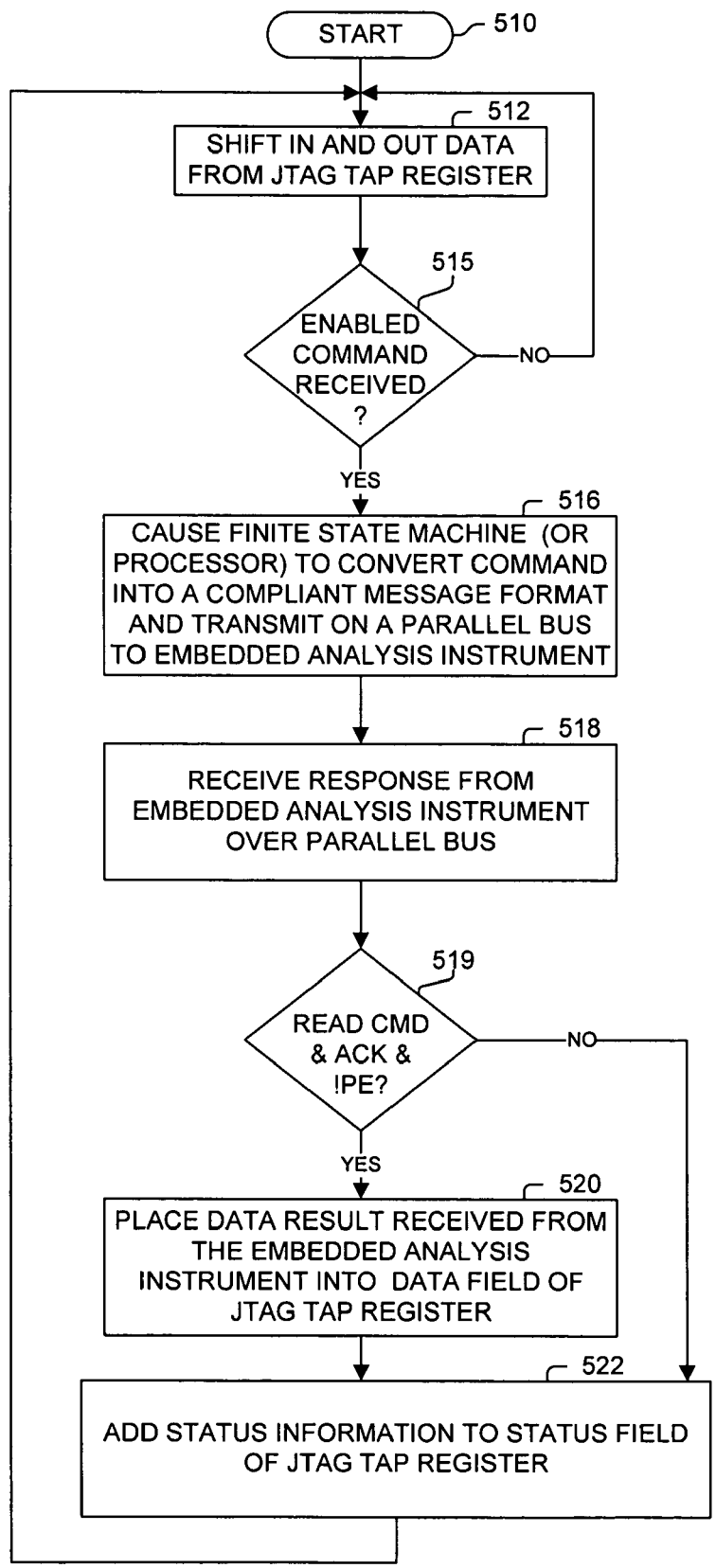
FIGS. 5B-C are flow diagrams illustrating processes used in one embodiment.

FIG. 5B is a flow diagram illustrating a process for converting JTAG commands into commands sent over a bus as performed in one embodiment. Processing begins with process block 510, and proceeds to process block 512, wherein data is shifted in and out of a JTAG TAP register. As determined in process block 515, if the shift-in data included an enabled command, then processing proceeds to process block 516, wherein the finite state machine (or processor or other mechanism) is caused to convert the command into a compliant message format, and is transmitted over a parallel bus to an embedded analysis instrument. In one embodiment, a bus interface switch is activated to couple the bus with the conversion mechanism so the message can be sent over the bus. In process block 518, a response is received over the parallel bus. As determined in process block 519, if it was a read command, an acknowledgment was received, and there was no parity error, then in process block 520, the data result received from the embedded analysis instrument is placed into the data field of the JTAG TAP register. In process block 522, the status information is added to the JTAG TAP register. Processing returns to process block 512.

Figure 5C:
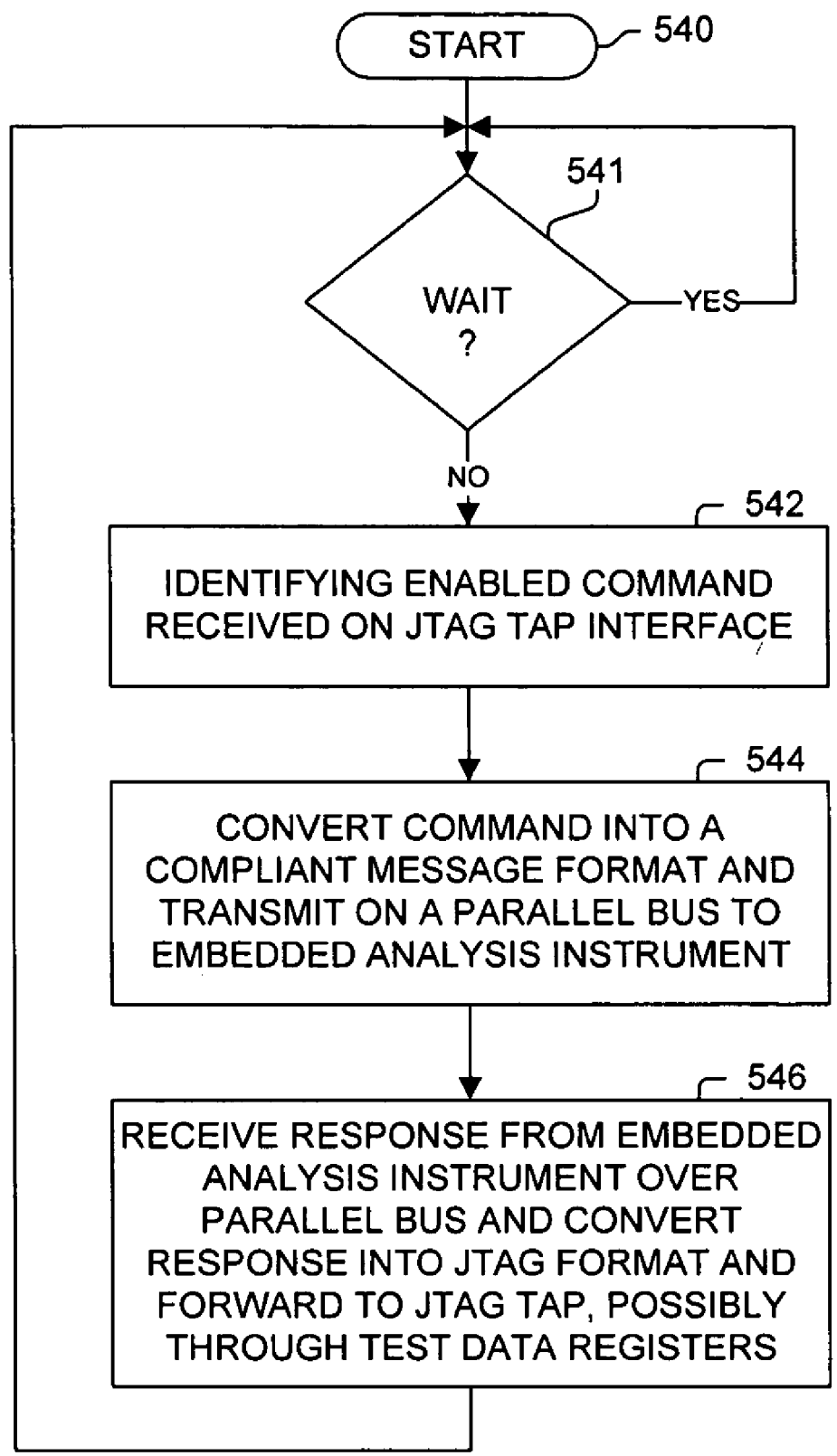

FIG. 5C is a flow diagram illustrating a process performed by a processor or finite state machine for converting JTAG commands into commands sent over a bus as performed in one embodiment. Processing begins with process block 540, and proceeds to process block 541, wherein it waits until a properly formatted and enabled JTAG command is received. Then, in process block 542, this enabled command received on the JTAG TAP interface is identified. In process block 544, the command is converted into a compliant message format and transmitted on a parallel bus to an embedded analysis instrument. In process block 546, the response is received over the parallel bus from the embedded analysis instrument, and is converted into a properly JTAG formatted message and forwarded to the JTAG TAP, possibly through test data registers. Processing returns to process block 541.

Figure 6:
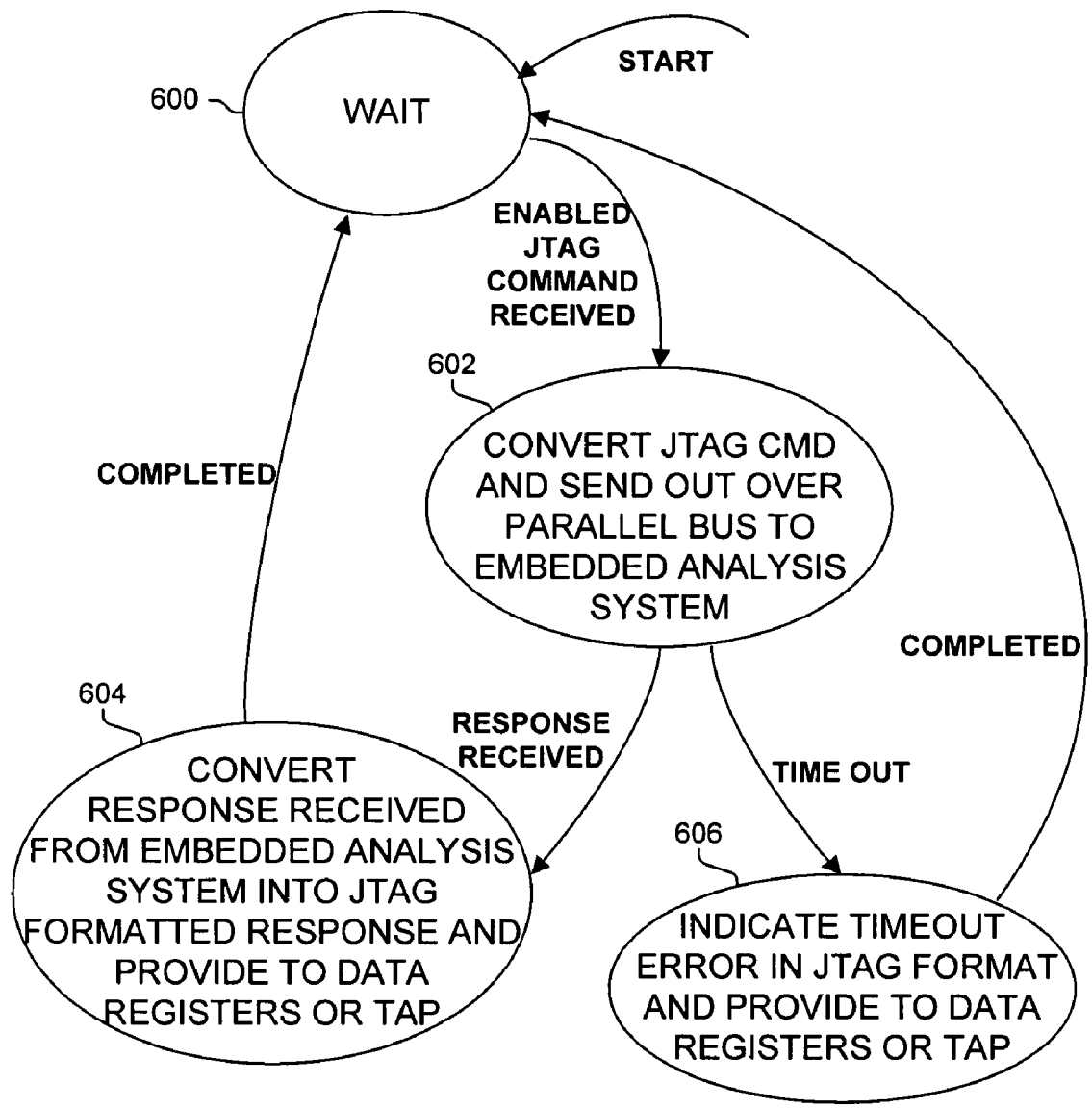
FIG. 6 is a state diagram illustrating some operations performed in one embodiment.

FIG. 6 is a state diagram illustrating some operations performed in one embodiment. Initially, the current state is set to wait state 600. In response to an enabled and properly formatted JTAG command being received, the current state transitions to state 602, wherein the JTAG command is converted and sent out over a parallel bus to an embedded analysis system. In response to receiving a response from the embedded analysis system, the current state transitions to state 604, wherein the response is converted into a properly formatted JTAG response message and provided to data registers or directly to the JTAG TAP so the response can be forwarded out the JTAG TAP. When complete, the current state returns to wait state 600. Otherwise, in response to a timeout, the current state transitions from state 602 to state 606, wherein a timeout error is indicated in a JTAG properly formatted response message and provided to data registers or directly to the JTAG TAP so the response can be forwarded out the JTAG TAP. When complete, the current state returns to wait state 600.

Figure 7:
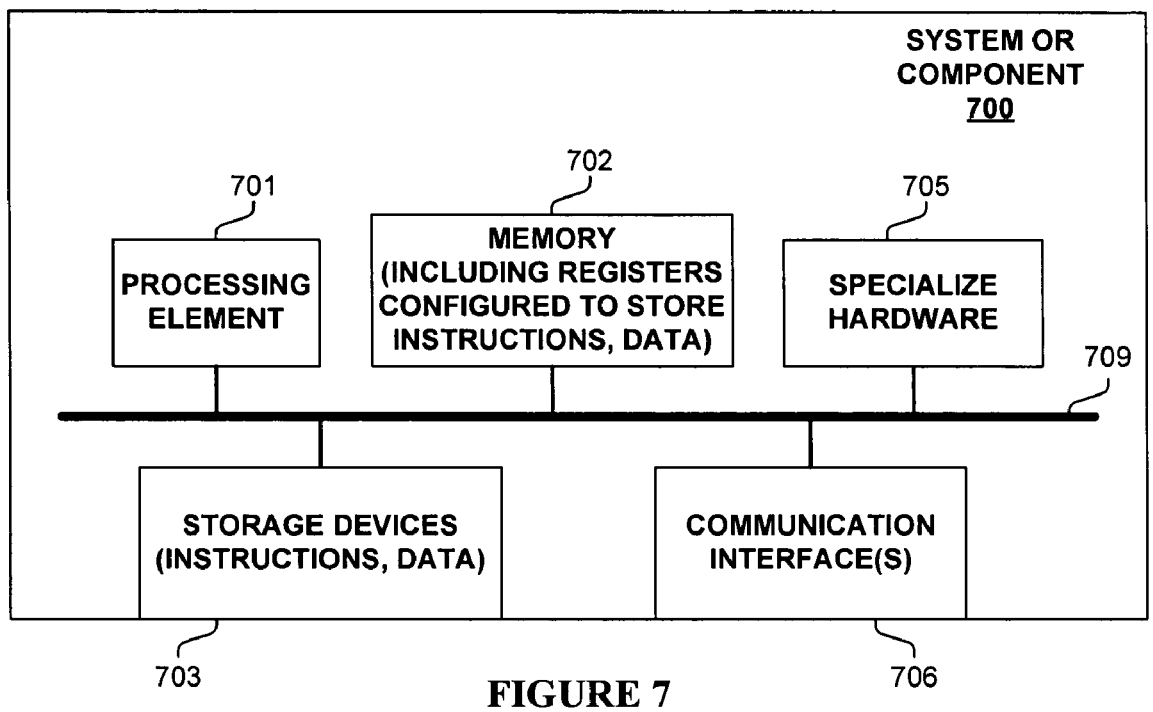
FIG. 7 is a block diagram of a system or component used in one embodiment.

FIG. 7 is block diagram of a system or component 700 used in one embodiment for providing a JTAG to system bus interface for accessing embedded analysis system(s). In one embodiment, system or component 700 performs one or more processes corresponding to one of the flow, state, and/or block diagrams illustrated or otherwise described herein. In one embodiment, system or component 700 is used as, or part of, a JTAG bus controller, or processor or state machine therein.

In one embodiment, system or component 700 includes a processing element 701, memory 702, storage devices 703, optionally specialized components 705, and interfaces 706 for sending and receiving JTAG and/or bus messages. These elements are typically communicatively coupled via one or more communications mechanisms 709, with the communications paths typically tailored to meet the needs of the application.

Various embodiments of component 700 may include more or less elements. The operation of component 700 is typically controlled by processing element 701 using memory 702 and storage devices 703 to perform one or more tasks or processes. Memory 702 is one type of computer-readable medium, and typically comprises random access memory (RAM), read only memory (ROM), flash memory, integrated circuits, and/or other memory components. Memory 702 typically stores computer-executable instructions to be executed by processing element 701 and/or data which is manipulated by processing element 701 for implementing functionality in accordance with an embodiment. Storage devices 703 are another type of computer-readable medium, and typically comprise solid state storage media, disk drives, diskettes, networked services, tape drives, and other storage devices. Storage devices 703 typically store computer-executable instructions to be executed by processing element 701 and/or data which is manipulated by processing element 701 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for communicating with embedded devices, the apparatus comprising:
   one or more parallel buses communicatively coupled to one or more devices including embedded analysis instruments;
   a JTAG interface configured for shifting in (receiving) and out (sending) serial JTAG commands and data; and
   a JTAG bus controller configured to interface said parallel buses and the JTAG interface; wherein said interfacing includes converting between said received serial commands and data into commands to be sent over said parallel buses to said embedded analysis instruments.

2. The apparatus of claim 1, wherein the JTAG bus controller is configured to convert between results received from said embedded analysis instruments over said parallel buses and results to be sent out the JTAG interface.

3. The apparatus of claim 2, wherein said embedded analysis instruments include one or more embedded testing instruments.

4. The apparatus of claim 2, wherein said embedded analysis instruments include one or more embedded debugging instruments.

5. The apparatus of claim 2, wherein said embedded analysis instruments include one or more built-in self-test (BIST) components.

6. The apparatus of claim 2, wherein the JTAG bus controller includes test registers and a communications finite state machine, wherein the test registers are configured to exchange said serial commands and data with the JTAG interface and the communications finite state machine is configured to perform said converting for sending and receiving information over said parallel buses.

7. The apparatus of claim 6, wherein the test registers and the JTAG interface are clocked based on a test clock signal, and the communications finite state machine is clocked based on a system clock signal, the system clock signal being at a different rate than the test clock signal.

8. The apparatus of claim 2, wherein the JTAG bus controller includes test registers and a communications processor, wherein the test registers are configured to exchange said serial commands and data with the JTAG interface and the communications processor is configured to perform said converting for sending and receiving information over said parallel buses.

9. The apparatus of claim 8, wherein the test registers and the JTAG interface are clocked based on a test clock signal, and the communications processor is clocked based on a system clock signal, the system clock signal being at a different rate than the test clock signal.

10. The apparatus of claim 2, including a bus interface switch communicatively coupled to an external BUS connector and a between the JTAG bus controller and said parallel buses, wherein the bus interface switch is configured communicate with said parallel buses and to selectively switch the between the external BUS connector and the JTAG bus controller.

11. A method for communicating based on JTAG commands with embedded analysis devices communicatively coupled via one or more parallel buses, the method comprising:
    receiving a JTAG command over a JTAG serial interface, the JTAG command defining to write to or read from a particular embedded analysis instrument;
    in response to said received JTAG command: converting said serially received JTAG command into a corresponding formatted command compatible with said one or more parallel buses, and causing said formatted command to be transmitted over said one or more parallel buses to a device including the particular embedded analysis instrument;
    receiving an embedded analysis response from the device including the particular embedded analysis instrument, the embedded analysis response including status or read data generated by the particular embedded analysis instrument in response to information included in said formatted command; and
    in response to receiving the embedded analysis response, converting the embedded analysis response into a properly formatted JTAG message and causing the properly formatted JTAG message to be sent out of the JTAG serial interface.

12. The method of claim 11, wherein said embedded analysis instruments include one or more embedded testing instruments.

13. The method of claim 11, wherein said embedded analysis instruments include one or more embedded debugging instruments.

14. The method of claim 11, wherein said embedded analysis instruments include one or more built-in self-test (BIST) components.

15. One or more tangible computer-readable media tangibly embodying instructions for communicating based on JTAG commands with embedded analysis devices communicatively coupled via one or more parallel buses, said operations comprising:

identifying a JTAG command received over a JTAG serial interface, the JTAG command defining to write to or read from a particular embedded analysis instrument;

in response to said identification of the received JTAG command: converting said serially received JTAG command into a corresponding formatted command compatible with said one or more parallel buses, and causing said formatted command to be transmitted over said one or more parallel buses to a device including the particular embedded analysis instrument;

identifying a received embedded analysis response from the device including the particular embedded analysis instrument, the embedded analysis response including status or read data generated by the particular embedded analysis instrument in response to information included in said formatted command; and in response to said identification of the received embedded analysis response, converting the embedded analysis response into a properly formatted JTAG message and causing the properly formatted JTAG message to be sent out of the JTAG serial interface.

16. An apparatus for communicating based on JTAG commands with embedded analysis devices communicatively coupled via one or more parallel buses, the apparatus comprising:

means for receiving a JTAG command over a JTAG serial interface, the JTAG command defining to write to or read from a particular embedded analysis instrument;

means for, in response to said received JTAG command: converting said serially received JTAG command into a corresponding formatted command compatible with said one or more parallel buses, and causing said formatted command to be transmitted over said one or more parallel buses to a device including the particular embedded analysis instrument;

means for receiving an embedded analysis response from the device including the particular embedded analysis instrument, the embedded analysis response including status or read data generated by the particular embedded analysis instrument in response to information included in said formatted command; and means for, in response to receiving the embedded analysis response, converting the embedded analysis response into a properly formatted JTAG message and causing the properly formatted JTAG message to be sent out of the JTAG serial interface.

17. The apparatus of claim 16, wherein means for converting said received JTAG command includes test registers and a communications finite state machine, wherein the test registers are configured to exchange said serial commands and data with said means for converting said received JTAG command and the communications finite state machine is configured to perform said converting for sending and receiving information over said parallel buses.

18. The apparatus of claim 17, wherein the test registers and said means for converting said received JTAG command are clocked based on a test clock signal, and the communications finite state machine is clocked based on a system clock signal, the system clock signal being at a different rate than the test clock signal.

19. The apparatus of claim 16, wherein means for converting said received JTAG command includes test registers and a communications processor, wherein the test registers are configured to exchange said serial commands and data with said means for converting said received JTAG command and the communications processor is configured to perform said converting for sending and receiving information over said parallel buses.

20. The apparatus of claim 16, including means for selectively switching communicative connectivity with said parallel buses between said means for converting said received JTAG command and an external BUS connector.

\* \* \* \* \*

UNITED STATES PATENT AND TRADEMARK OFFICE
CERTIFICATE OF CORRECTION

| | | |
|---|---|---|
| PATENT NO. | : 7,543,208 B2 | |
| APPLICATION NO. | : 11/493784 | |
| DATED | : June 2, 2009 | |
| INVENTOR(S) | : Jun et al. | |

It is certified that error appears in the above-identified patent and that said Letters Patent is hereby corrected as shown below:

Col. 11, line 36, replace "transmiffed" with -- transmitted --

Signed and Sealed this

Third Day of November, 2009

David J. Kappos
*Director of the United States Patent and Trademark Office*